US 8,823,866 B2

(12) United States Patent
Kimoto

(10) Patent No.: US 8,823,866 B2
(45) Date of Patent: Sep. 2, 2014

(54) IMAGE PICKUP APPARATUS, METHOD OF CONTROLLING THE SAME, AND STORAGE MEDIUM

(75) Inventor: Satoshi Kimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 13/359,890

(22) Filed: Jan. 27, 2012

(65) Prior Publication Data
US 2012/0194731 A1 Aug. 2, 2012

(30) Foreign Application Priority Data

Feb. 2, 2011 (JP) ................................. 2011-021012

(51) Int. Cl.
H04N 5/232 (2006.01)
G03B 13/00 (2006.01)
G03B 13/36 (2006.01)
G02B 7/36 (2006.01)

(52) U.S. Cl.
CPC .............. G02B 7/365 (2013.01); G03B 13/36 (2013.01); H04N 5/23212 (2013.01)
USPC .......................................... 348/353; 348/349

(58) Field of Classification Search
CPC ....... H04N 5/23212; G03B 13/36; G02B 7/36
USPC ................................................. 348/345–353
See application file for complete search history.

(56) References Cited

U.S. PATENT DOCUMENTS

| 2006/0028579 A1* | 2/2006 | Sato ............................. 348/362 |
| 2007/0273783 A1* | 11/2007 | Okazaki et al. ............... 348/345 |
| 2009/0059025 A1* | 3/2009 | Tsujino et al. ............. 348/222.1 |
| 2009/0207299 A1* | 8/2009 | Hori ............................. 348/349 |
| 2009/0219406 A1* | 9/2009 | Matsuyama ............... 348/222.1 |
| 2010/0141796 A1* | 6/2010 | Haruta et al. .................. 348/234 |
| 2010/0208126 A1* | 8/2010 | Uenishi ........................ 348/345 |

FOREIGN PATENT DOCUMENTS

| CN | 1716083 A | 1/2006 |
| CN | 1727982 A | 2/2006 |
| CN | 101344702 A | 1/2009 |
| CN | 101918892 A | 12/2010 |
| JP | 8-265631 A | 10/1996 |

* cited by examiner

Primary Examiner — Kelly L Jerabek
(74) Attorney, Agent, or Firm — CANON USA, Inc. IP Division

(57) ABSTRACT

An image pickup apparatus includes an image sensing unit that generates an image signal by performing a photoelectric conversion on an object image, a focus evaluation value calculation unit that calculates a focus evaluation value indicating a contrast of the image signal, a control unit that controls a position of a focus lens based on the focus evaluation value, a focus level calculation unit that calculates a focus level indicating a degree of focus using the focus evaluation value, and a detection unit that detects an exposure condition in taking an image of an object. The control unit determines a condition in terms of driving the focus lens based on the focus level corresponding to the exposure condition.

11 Claims, 12 Drawing Sheets

IMAGE PICKUP APPARATUS, METHOD OF CONTROLLING THE SAME, AND STORAGE MEDIUM

BACKGROUND OF THE INVENTION

1. Field of the Invention

Embodiments of the present disclosure relate to an image pickup apparatus, a method of controlling the image pickup apparatus, and a storage medium. More particularly, the one disclosed aspect of the embodiments relates to an image pickup apparatus having auto focus capability, a method of controlling an image pickup apparatus having auto focus capability, and a program storing a program form controlling an image pickup apparatus having auto focus capability.

2. Description of the Related Art

One known method of achieving auto focus capability in an image pickup apparatus such as a digital camera is to move a focus lens based on a luminance signal supplied from an image sensor such as a CCD device so as to focus on an object. More specifically, a focus evaluation value indicating the contrast in a focus detection area is calculated using a high-frequency component of a signal in the focus detection area set in an image screen. The image pickup apparatus calculates the focus evaluation value while moving the focus lens in a direction in which the focus evaluation value increases, and detects a position of the focus lens where the focus evaluation value has a highest value. The detected position of the focus lens is employed as an in-focus position. This operation is called a hill-climbing AF (Auto Focus) operation. The focus evaluation value is then acquired while moving the focus lens forth and back in a short range around the in-focus position to confirm that the focus lens is in a position at which the focus evaluation value has a maximum value (i.e., at which the focus evaluation value has a peak of a hill-shaped curve). This operation is called "wobbling". In a case where it is detected that the focus lens is not in a position where the focus evaluation value has a maximum value, the image pickup apparatus moves the focus lens to the position where the focus evaluation value has the maximum value. In this manner, the image pickup apparatus controls the focus lens so as to be maintained in the in-focus position.

In the hill-climbing AF operation and the wobbling, a focus level (indicating how good focus is obtained) at the current position of the focus lens is calculated based on the focus evaluation value, and a condition of driving the focus lens is switched depending on the calculated focus level. For example, the moving speed of the focus lens in the hill-climbing AF operation is set such that the lower the focus level, the greater the moving speed. In the wobbling, the moving distance of the focus lens is set such that the lower the focus level, the greater the moving distance. Conversely, the moving speed of the focus lens in the hill-climbing AF operation is set such that the higher the focus level, the smaller the moving speed, while in the wobbling, the moving distance of the focus lens is set such that the higher the focus level, the smaller the moving distance per one AF control. This method makes it possible to achieve a quick transition to a high focus level state from a low focus level. Furthermore, in the vicinity of the in-focus position, the method prevents the focus lens from overshooting the in-focus position.

In the auto focus method described above, it is necessary that the focus level should change properly as a function of a change in focus. However, if the luminance signal includes large noise, the noise may cause the focus level not to change in an expected proper manner, which may cause the auto focus operation to become unstable.

Japanese Patent Laid-Open No. 8-265631 discloses a technique in which a frequency characteristic of a bandpass filter is adaptively changed depending on a luminance signal. When luminance is high, a luminance signal includes high frequency components, and thus the frequency characteristic of the bandpass filter is shifted toward a higher frequency such that high frequency components are properly extracted. On the other hand, when luminance is low, the luminance signal includes less high frequency components, and thus the frequency characteristic of the bandpass filter is shifted toward a lower frequency such that low frequency components are extracted. This makes it possible to properly acquire focus evaluation values that allow the auto focus operation to be properly performed depending on a scene.

However, the method disclosed in Japanese Patent Laid-Open No. 8-265631 has a drawback that a large circuit scale is needed to realize the capability of changing the frequency characteristic of the bandpass filter. In the technique disclosed in Japanese Patent Laid-Open No. 8-265631, particular frequency components are extracted by first passing the luminance signal in the focus detection area through a TE-LPF which is a lowpass filter with a high cutoff frequency and then through an FE-LPF which is a lowpass filter with a low cutoff frequency. By subtracting one peak value from the other peak value, the focus level (TE/FE peak value) is calculated. In this method of calculating the focus level using the peak values, the focus level has a low dependence on the object and is not greatly influenced by camera shaking or the like. However, when the luminance signal includes a rather large noise component as in a low light scene, a high frequency component generated by the noise may cause the focus level to be calculated high regardless of whether a good focus is actually obtained or not. This may cause the focus level not to behave in an expected proper manner.

SUMMARY OF THE INVENTION

In view of the above, one disclosed aspect of the embodiments provides an image pickup apparatus capable of achieving a good focus even when an image signal includes rather large noise. One embodiment also provides a method of adjusting the focus such that a good focus is obtained even when an image signal includes rather large noise. Another embodiment also provides a storage medium storing a program for the focus adjustment. Yet another embodiment provides an image pickup apparatus capable of calculating a focus level without being influenced significantly or at all by noise even when an image signal includes rather large noise, and the embodiment provides a method of adjusting the focus without being influenced significantly or at all by noise, and a storage medium storing a program for the focus adjustment.

According to an aspect of the embodiments, there is provided an image pickup apparatus comprising an image sensing unit that generates an image signal by performing a photoelectric conversion on an object image, a focus evaluation value calculation unit that calculates a focus evaluation value indicating a contrast of the image signal, a control unit that controls a position of a focus lens based on the focus evaluation value, a focus level calculation unit that calculates a focus level indicating a degree of focus using the focus evaluation value, and a detection unit that detects an exposure condition in taking an image of an object, wherein the control unit determines a condition in terms of driving the focus lens based on the focus level depending on the exposure condition.

Further features of the embodiments will become apparent from the following description of exemplary embodiments with reference to the attached drawings.

DESCRIPTION OF THE EMBODIMENTS

The embodiments are described in further detail below with reference to embodiments in conjunction with the accompanying drawings. One disclosed feature of the embodiments may be described as a process which is usually depicted as a flowchart, a flow diagram, a timing diagram, a structure diagram, or a block diagram. Although a flowchart or a timing diagram may describe the operations or events as a sequential process, the operations may be performed, or the events may occur, in parallel or concurrently. An operation in a flowchart may be optional. In addition, the order of the operations or events may be re-arranged. A process is terminated when its operations are completed. A process may correspond to a method, a program, a procedure, a method of manufacturing or fabrication, a sequence of operations performed by an apparatus, a machine, or a logic circuit, etc.

Overall Structure of Image Pickup Apparatus

Figure 1:
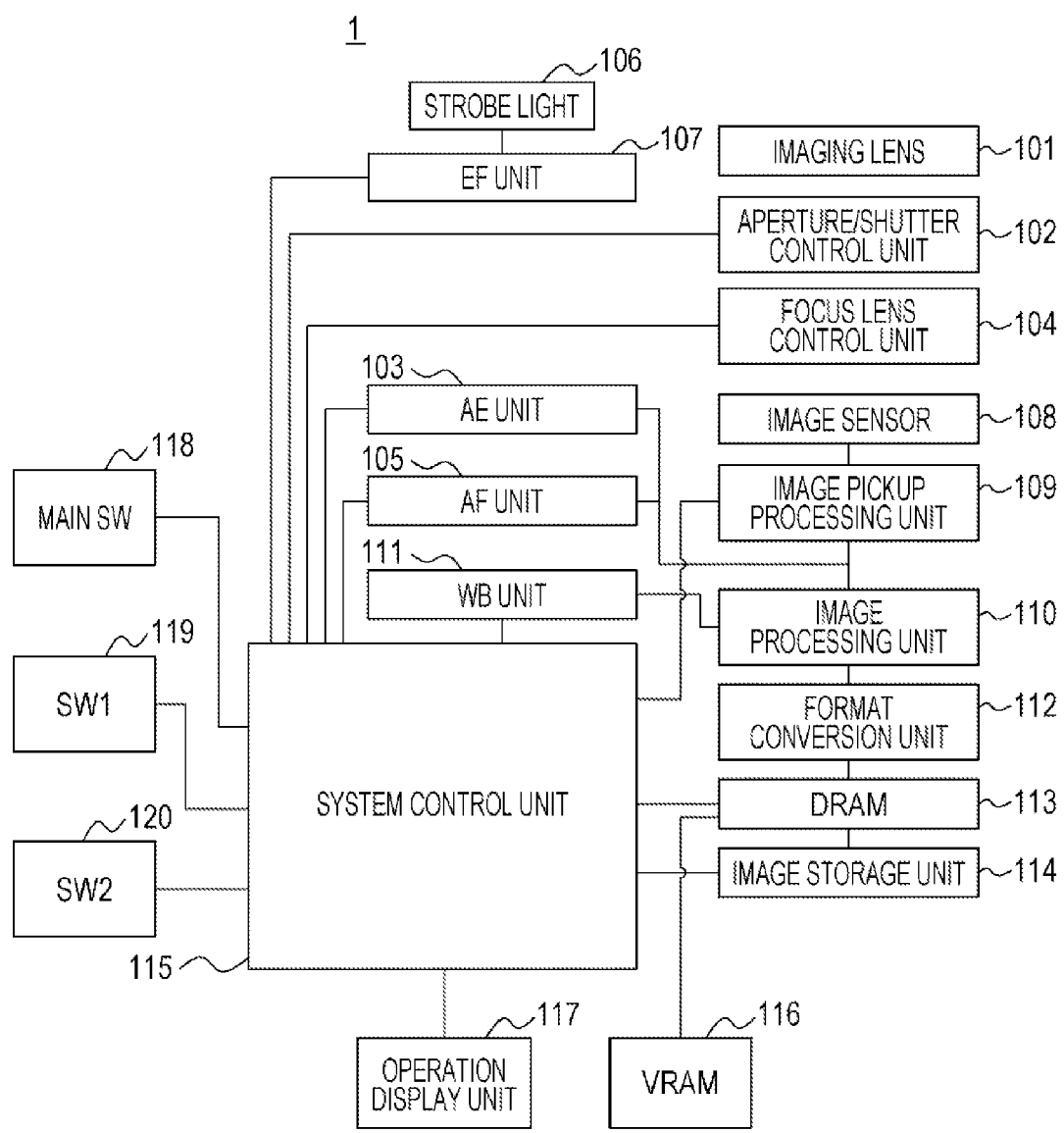
FIG. 1 is a block diagram illustrating main units of an image pickup apparatus according to an embodiment.

First, an overall structure of an image pickup apparatus 1 according to an embodiment is described. FIG. 1 is a block diagram schematically illustrating the structure of the image pickup apparatus 1 according to the present embodiment. A system control unit 115 includes, for example, a central processing unit (CPU), a random access memory (RAM), and a read only memory (ROM). The system control unit 115 controls the general operation of the image pickup apparatus 1 according to a program stored in advance in the ROM while using the RAM as a working area. Note that processes described below are performed mainly by the system control unit 115 by executing a computer program (software). The system control unit 115, as a control unit, detects an in-focus position based on a focus evaluation value calculated by an autofocus (AF) unit 105, and controls a focus lens control unit 104 to move a focus lens thereby to perform an AF adjustment process. The focus evaluation value is a value indicating the contrast in a focus detection area.

An imaging lens 101 may be a common imaging lens having a zoom function. An aperture/shutter control unit 102 controls an aperture and a shutter to control the amount of light. A focus lens control unit 104 controls driving of the focus lens such that an image is focused on an image sensor 108. The aperture/shutter control unit 102 includes optical elements such as a lens and mechanical elements such as an aperture m a shutter, etc., while the focus lens control unit 104 includes devices for driving the elements described above. The devices include actuators for driving the optical elements and the mechanical elements, a circuit for controlling the actuators, a digital-to-analog (D/A) converter, etc. A light emitting apparatus (strobe light) 106 emits light toward the outside to adjust the object luminance. When an EF (Electronic Flash) unit 107 receives a "FLASH ON" signal from the system control unit 115, the EF unit 107 controls the light emitting apparatus (strobe light) 106 to emit light. Note that the FLASH ON signal is sent from the system control unit 115 to the EF unit 107 when the system control unit 115 determines that it is necessary to emit light from the light emitting apparatus (strobe light) 106.

The image sensor 108 may be realized using a photosensing device or a photoelectric conversion device that converts incident light into an electric signal. More specifically, the image sensor 108 may be a photoelectric conversion element such as a Charge-Coupled Device (CCD) or a Complementary Metal Oxide Semiconductor (CMOS) imager that converts incident light into an electric signal and outputs the resultant electric signal as an image signal. An image pickup processing unit 109 includes a Correlated Double Sampler (CDS) circuit, a nonlinear amplifier, and an analog-to-digital converter. The CDS circuit removes output noise of the image sensor 108 by using a correlated double sampling method. The nonlinear amplifier amplifies (controls the gain) the image signal after the noise is removed by the CDS circuit. The analog-to-digital converter converts the image signal from an analog form into a digital signal. The image sensor 108 and the image pickup processing unit 109 form an image pickup unit that acquires the image signal when an image of an object is taken.

An image processing unit 110 performs image processing such as a gamma correction, an edge correction, etc., on the image signal (image data). The image processing unit 110 also performs a white balance process on the image signal under the control of a WB (wobbling) unit 111. A format conversion unit 112 converts the supplied image signal into a format suitable for storing in a storage medium by an image storage unit 114 (described later) or suitable for displaying on an operation/display unit 117 (described later). A Dynamic Random Access Memory (DRAM) 113 is a high-speed internal memory (for example, a random access memory). The DRAM 113 is used as a high-speed buffer serving as a storage unit for temporarily storing the image signal. The DRAM 113 is also used as a work memory in a process of compressing or decompressing the image signal. The image storage unit 114 is capable of storing the image signal. The image storage unit 114 includes a storage medium such as a memory card and an interface therefor.

An Auto Exposure (AE) unit 103 calculates a photometry value indicating the brightness of an object based on the image signal supplied from the image pickup unit (including the image sensor 108 and the image pickup processing unit 109). That is, the AE unit 103 and the image pickup processing unit 109 function as a detection unit that detects an exposure condition in taking an image of an object. The AE unit 103 determines the signal gain such that when the object luminance is low, the image signal is properly amplified to achieve a proper exposure condition. In other words, the AE unit 103 determines the signal gain such that the image signal is corrected to achieve a proper exposure. Based on the photometry value calculated by the AE unit 103, the system control unit 115 controls the aperture/shutter control unit 102 and the nonlinear amplifier of the image pickup processing unit 109. Thus, the system control unit 115 automatically controls the exposure in the above-described manner. In other words, the system control unit 115 performs an AE control using the exposure condition detected by the detection unit. The AF unit 105 extracts high-frequency components from the image signal provided by the image pickup unit (including the image sensor 108 and the image pickup processing unit 109) and calculates the focus evaluation value therefrom.

A Video Random Access Memory (VRAM) 116 used as an image display memory is configured to store the image signal or the like. The operation/display unit 117 is configured to display an image, information for assisting an operation, information indicating a state of the camera, etc. During an image taking operation, an image taken may be displayed on the operation/display unit 117. A main switch (main SW) 118 is a switch used to turn on/off electric power of the image pickup apparatus according to the present embodiment. A first switch (SW1) 119 is a switch used to control a shoot preparation operation (operation for making preparation for shooting) including an AF operation, an AE operation, etc. If a second switch (SW2) 120 is operated after the first switch 119 is operated, an image is taken.

AF Unit

Figure 2:
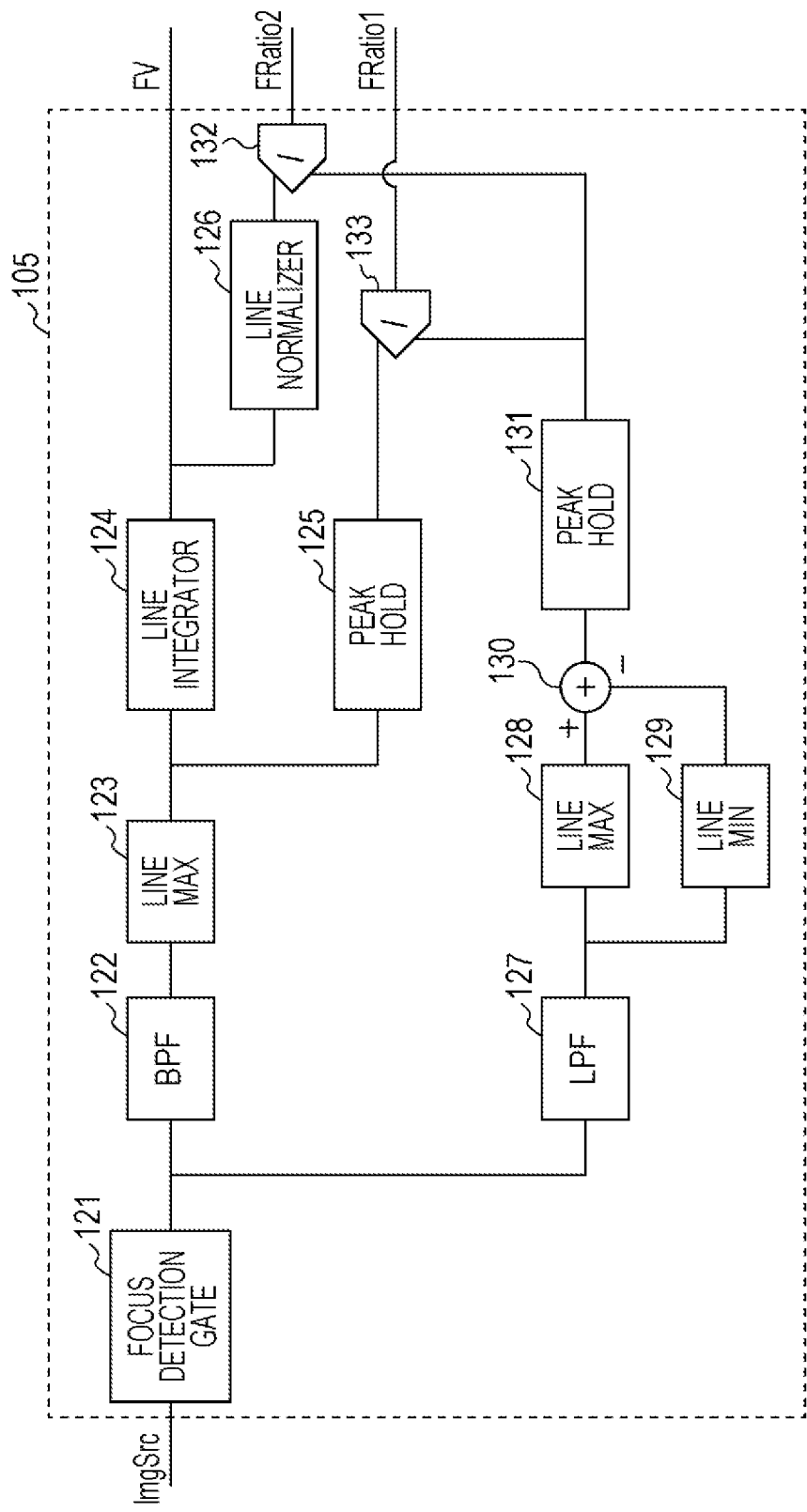
FIG. 2 is a block diagram illustrating an AF unit of an image pickup apparatus according to an embodiment.

Next, the AF unit 105 is described in further detail below. FIG. 2 is a block diagram schematically illustrating the structure of the AF unit 105. The AF unit 105 includes a focus detection gate 121, a bandpass filter (BPF) 122, a maximum line value detector (Line Max) 123, a line integrator 124, a peak holding unit (Peak Hold) 125, and a line normalizer 126. The AF unit 105 further includes a lowpass filter (LPF) 127, a maximum line value detector (Line Max) 128, a minimum line value detector (Line Min) 129, and a peak holding unit (Peak Hold) 131. The AF unit 105 still further includes an adder 130 and two dividers 132 and 133.

An image signal ImgSrc output from the image pickup unit (including the image sensor 108 and the image pickup processing unit 109) is input to one or more focus detection gates 121. Note that in the example shown in FIG. 2, the AF unit 105 has one focus detection gate 121. The focus detection gate 121 extracts an image signal in a particular area (focus detection area) in the screen from the input image signal ImgSrc supplied from the image pickup unit (including the image sensor 108 and the image pickup processing unit 109). The extracted image signal is transmitted to the bandpass filter (BPF) 122 and the lowpass filter (LPF) 127.

The bandpass filter (BPF) 122 further extracts particular high-frequency components (frequency components in a particular frequency band) from the supplied image signal. The maximum line value detector (Line Max) 123 detects a maximum value for each horizontal line from the high-frequency components extracted by the bandpass filter (BPF) 122. The line integrator (Line Itg) 124 integrals the maximum values of the respective horizontal lines detected by the maximum line value detector 123 along a vertical line extracted by the focus detection gate 121. Thus, a focus evaluation value FV is produced. More specifically, the AF unit 105, as a focus evaluation value calculation unit, calculates the focus evaluation value indicating the contrast of the image signal within the particular area (focus detection area) of the image signal. Thus, the AF unit 105 functions as a "focus evaluation value calculation unit". The focus evaluation value FV is used in the auto focus (AF) operation performed in the image pickup apparatus 1 according to the present embodiment.

The line normalizer (Line Normalize) 126 divides the integrated value calculated by the line integrator (Line Itg) 124 along the vertical direction by the number of lines in the vertical direction. As a result, a normalized focus evaluation value (normalized FV) normalized with respect a value corresponding to the output level of one pixel is obtained. That is, the normalized focus evaluation value (normalized FV)=(focus evaluation value FV)/(number of lines in vertical direction). The normalized focus evaluation value (normalized FV) is used in calculating a second focus level (FRatio2) as will be described later. The peak holding unit (Peak Hold) 125 calculates a peak FV that is a peak value among values output by the maximum line value detector (Line Max) 123 within the lines extracted by the focus detection gate 121. More specifically, first, the maximum line value detector 123 detects a maximum luminance value in each of all horizontal lines included in the extracted area. The peak holding unit 125 then calculates a maximum value (peak FV) among the maximum luminance value of the respective horizontal lines. This peak FV is used in calculating a first focus level (FRatio1) as will be described later.

The lowpass filter (LPF) 127 removes high-frequency components (components in a particular frequency band) from the image signal ImgSrc extracted by the focus detection gate 121. The maximum line value detector (Line Max) 128 detects a maximum luminance value in each horizontal line passed through the lowpass filter 127. The minimum line value detector (Line Min) 129 detects a minimum luminance value in each horizontal line passed through the lowpass filter 127. The adder 130 calculates the difference between the maximum value and the minimum value (i.e., the maximum value−the minimum value) for each horizontal line. The peak holding unit 131 detects a peak value MM indicating a largest value of maximum-minimum differences among the horizontal lines within the focus detection gate 121. Note that the peak value MM substantially indicates the maximum contrast value within the focus detection gate 121.

The first divider 133 divides the peak focus evaluation value (peak FV) by the peak value MM. As a result, the first focus level (FRatio1) is obtained. That is, the first focus level (FRatio1) is calculated by the first divider 133 by dividing the peak focus evaluation value (peak FV) by the peak value MM. The second divider 132 divides the normalized focus evaluation value (normalized FV) by the peak value MM. As a result the second focus level (FRatio2) is obtained. That is, the second focus level (FRatio2) is calculated by the second divider 132 by dividing the normalized focus evaluation value (normalized FV) by the peak value MM.

As described above, the AF unit 105, as a focus level calculation unit, calculates the first focus level (FRatio1) indicating how good the focus is by using the focus evaluation values FV. The AF unit 105 also calculates the second focus level (FRatio2) different from the first focus level using the focus evaluation values FV.

Although in the example shown in FIG. 2, the AF unit 105 includes one focus detection gate 121, the AF unit 105 may include a plurality of focus detection gates 121. In a case where the AF unit 105 includes a plurality of focus detection gates 121, it is necessary to provide a plurality of circuits associated with the respective focus detection gates 121 so that the focus evaluation value FV, the first focus level (FRatio1), and second focus level (FRatio2) each have a plurality of values corresponding to the respective focus detection gates 121. The system control unit 115 may select one particular signal selected from the plurality of signals described above depending on a condition and perform the auto focus operation based on the selected signal, or the system control unit 115 may perform the auto focus operation based on the plurality of signals.

Next, a manner in which values change is discussed below in terms of the focus evaluation value FV calculated by the focus evaluation value calculation unit (the AF unit 105 of the system control unit 115 of the image pickup apparatus 1 according to the present embodiment of the intention), the first focus level (FRatio1), and the second focus level (FRatio2). The focus level is a measure of how good the focus on an object is. The focus level is a function of the difference in luminance among pixels. In general, the better the focus, the higher the focus level.

Figure 9A:
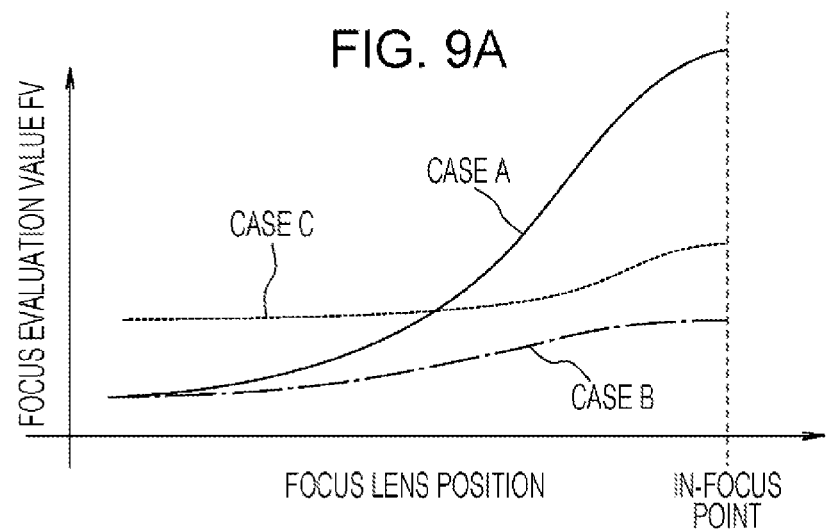
FIGS. 9A, 9B, and 9C are graphs illustrating a focus evaluation value and focus levels as a function of a focus lens position obtained in an image pickup apparatus according to an embodiment.
Figure 9B:
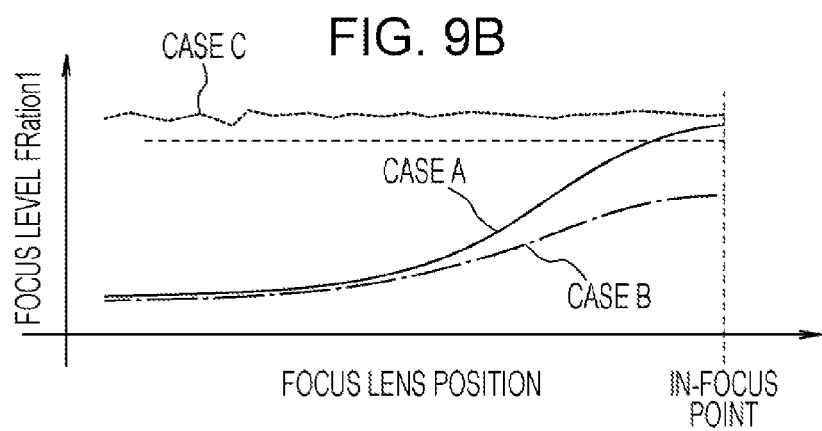
Figure 9C:
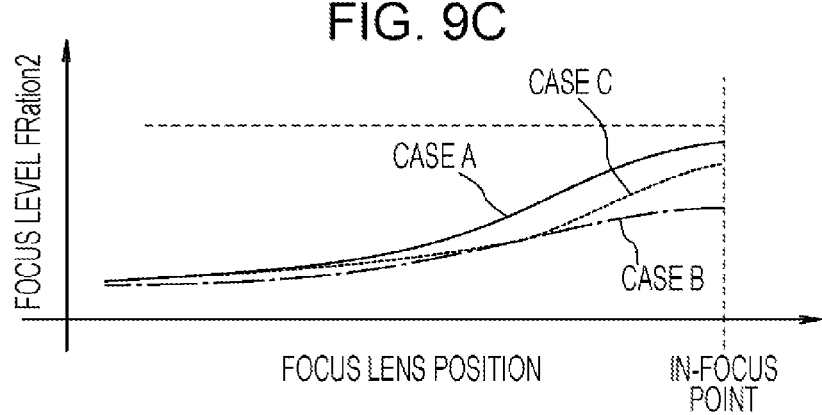

FIGS. 9A, 9B, and 9C are graphs illustrating manners of changes in the focus evaluation value and the focus levels of the image pickup apparatus according to the present embodiment. More specifically, FIG. 9A illustrates examples of changes in the focus evaluation value FV that may occur when the focus lens is moved from an out-of-focus position (where an image is greatly out of focus) to an in-focus position. FIG. 9B illustrates examples of changes in the first focus level (FRatio1) that may occur when the focus lens is moved from an out-of-focus position to an in-focus position. FIG. 9C illustrates examples of changes in the second focus level (FRatio2) that may occur when the focus lens is moved from an out-of-focus position to an in-focus position. In these figures, "CASE A" illustrates a case where an image of a common object is taken. "CASE B" illustrates a case where an object is lower in contrast than in the "CASE A" is taken. "CASE C" illustrates a case where an image of an object is taken in a low light condition and an obtained image signal is amplified.

As shown in FIG. 9A, the focus evaluation value FV at the in-focus position greatly changes depending on the type of the object and the image taking conditions (such as the object luminance, the luminance, the focal length, etc.). As shown in FIG. 9B, in the CASE A and CASE B, the first focus level (FRatio1) increases as the focus lens approaches the in-focus position. The value of the first focus level (FRatio1) in the CASE A is generally greater than that in the CASE B. As shown, in the CASE A and the CASE B, the first focus level (FRatio1) tends to change depending on the contrast of the object. That is, in general, the focus level tends to change depending on the contrast of the object. In other words, the focus level may be expected to change depending on the contrast of the object.

On the other hand, in the CASE C, unlike in the CASE A and the CASE B, the first focus level (FRatio1) generally has a high value over a wide range of the focus lens position. As described above, the first focus level (FRatio1) for the amplified image signal may change in a manner different from the common (expected) manner. This is because the first focus level (FRatio1) is calculated using the peak focus evaluation value (peak FV) output from the peak holding unit 125. That is, the first focus level (FRatio1) calculated based on the peak focus evaluation value (peak FV) is sensitive to a change in the output of the bandpass filter (BPF) 122. At the same time, the first focus level (FRatio1) calculated in the above-described manner is strongly influenced by high frequency components caused by noise included in the image signal ImgSrc.

On the other hand, as shown in FIG. 9C, the second focus level (FRatio2) tends to change depending on the contrast of the object in all cases A, B, and C. This is because the second focus level (FRatio2) is calculated using the normalized focus evaluation value (normalized FV). That is, the normalized focus evaluation value (normalized FV) is calculated based on the focus evaluation value FV normalized by the line normalizer 126. The normalized focus evaluation value (normalized FV) calculated by the line normalizer 126 is equivalent to the peak focus evaluation value (peak FV). In the calculation of the second focus level (FRatio2), values are integrated in the vertical direction performed by the line integrator 124, and thus changes in signal are averaged and the second focus level (FRatio2) changes moderately. The second focus level (FRatio2) receives less influence of high frequency components caused by noise included in the image signal ImgSrc is reduced, and thus it is possible to extract an intrinsic change without being influenced by noise.

According to the present embodiment, the image pickup apparatus 1 properly selects the first focus level (FRatio1) or the second focus level (FRatio2), which are different in characteristic, depending on the scene to be shot. This makes it possible for the image pickup apparatus to be capable of performing the high-reliability and high-precision auto focus operation according to the present embodiment.

AF Operation

Figure 3:
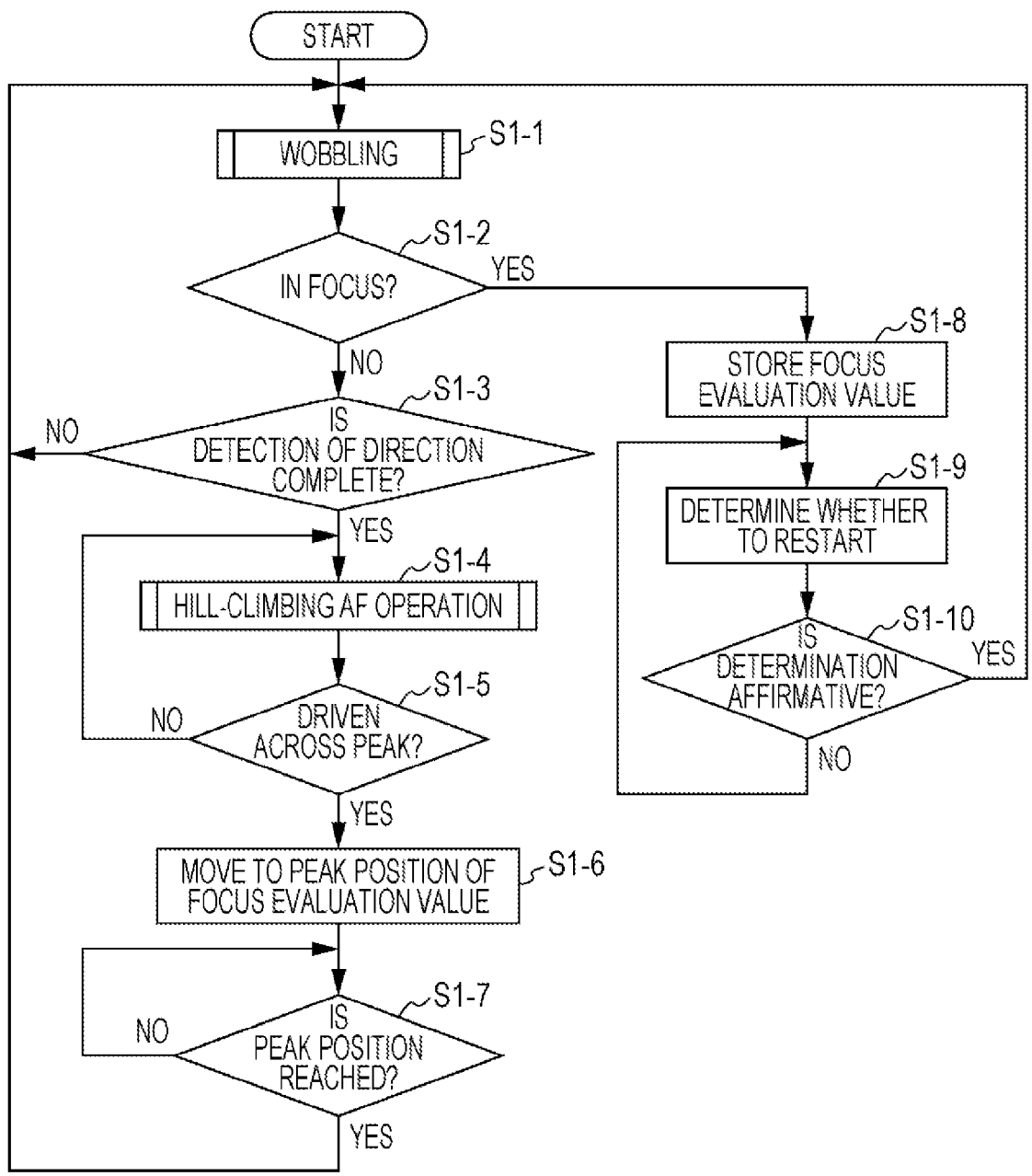
FIG. 3 is a flow chart illustrating AF processing performed in an image pickup apparatus according to an embodiment.

Next, an AF operation performed in recording a moving image is described. FIG. 3 is a flow chart illustrating an AF operation. The AF operation shown in FIG. 3 may be performed according to a computer program (software) stored in a ROM or the like of the system control unit 115. More specifically, after electric power is turned on by operating a main switch 118 to start the image pickup apparatus 1 according to the present embodiment, the AF operation may be performed mainly by the system control unit 115. The system control unit 115 selects the first focus level or the second focus level based on the exposure condition detected by the detection unit. The system control unit 115 determines conditions of driving the focus lens using the selected focus level.

After the startup, the system control unit 115 of the image pickup apparatus 1 according to the present embodiment periodically acquires a focus evaluation value. First, in operation S1-1, wobbling is performed. Details of the wobbling operation will be described later. In operation S1-1, a determination is made as to whether the focus lens is in an in-focus position. In a case where it is determined that the focus lens is in an in-focus position (i.e., if the answer to operation S1-1 is Yes), the process proceeds to operation S1-8. On the other hand, in a case where it is determined that the focus lens is not in an in-focus position (i.e., if the answer to operation S1-1 is No), the process proceeds to operation S1-3. In operation S1-3, a determination is made as to in which direction the in-focus position is located in. That is, the determination is made as to whether the in-focus position is located in a forward or backward direction from the current position of the focus lens. In a case where the determination in operation S1-3 as to the direction of the in-focus position is not complete (that is, the answer to operation S1-3 is No), the process returns to operation S1-1 to continue the wobbling. On the other hand, in a case where the determination in operation S1-3 as to the direction of the in-focus position is complete (i.e., the answer to operation S1-3 is Yes), the process proceeds to operation S1-4.

In operation S1-4, a hill-climbing AF operation is performed. In the hill-climbing AF operation, the focus lens is moved in a direction in which the focus evaluation value increases, at a higher speed than the speed in the wobbling operation. Details of the hill-climbing AF operation will be described later. Then in operation S1-5, a determination is made as to whether the focus lens is driven beyond a peak of the focus evaluation value in the hill-climbing AF operation. In a case where the determination in operation S1-5 is that the peak of the focus evaluation value is not yet reached (i.e., the answer to operation S1-5 is No), the process returns to operation S1-4 to continue the hill-climbing AF operation. In a case where it is determined in operation S1-5 that the focus lens has been driven beyond the peak of the focus evaluation value (i.e., if the answer to operation S1-5 is Yes), the process proceeds to operation S1-6. In operation S1-6, the system control unit 115 controls the focus lens control unit 104 to move the focus lens to the position where the focus evaluation value has its peak. That is, the focus lens is moved back in the reverse direction by a distance by which the focus lens has been moved further from the peak. Then in operation S1-7, a determination is made as to whether the moving of the focus lens to the position where the focus evaluation value has its peak is complete. If it is determined that the moving is complete (i.e., if the answer to operation S1-7 is Yes), the process returns to operation S1-1. In a case where it is determined that the moving is not complete yet (i.e., if the answer to operation S1-7 is No), the process waits in operation S1-7 until the moving is complete.

In a case where it is determined in operation S1-2 that the focus lens is in the in-focus position (i.e., the answer to operation S1-2 is Yes), the process jumps to operation S1-8. In operation S1-8, the focus evaluation value in the in-focus state is stored in the DRAM 113. The focus evaluation value stored in the DRAM 113 is used in operation S1-9 and operation S1-10 to determine whether to restart the focus adjustment operation. In the determination in operation S1-9 as to whether to restart the focus adjustment operation, the focus evaluation value in the in-focus state stored in the operation S1-8 is compared with a newest focus evaluation value. In operation S1-10, based on a result of the determination in operation S1-9 as to the restarting, a determination is made as to whether the condition for the restarting is met. More specifically, if the difference between the focus evaluation value in the in-focus state stored in operation S1-8 and the newest focus evaluation value is equal to or greater than a predetermined value, it is determined that the condition for the restarting the focus adjustment operation is met. In a case where it is determined in operation S1-10 that the condition for the restarting is met (i.e., if the answer to operation S1-10 is Yes), the process returns to operation S1-1 to restart the focus adjustment operation. On the other hand, in a case where it is determined that the condition for the restarting is not met (i.e., the answer to operation S1-10 is No), the process returns to operation S1-9. In this case, the determination as to the restarting is performed repeatedly based on the focus evaluation value that is acquired periodically. That is, a change in the focus evaluation value is monitored.

In the AF operation, as described above, the system control unit 115 of the image pickup apparatus 1 according to the present embodiment continuously performs the wobbling operation, the hill-climbing AF operation, and the restart determination. By performing the AF operation in the above-described manner, the system control unit 115 controls the focus lens such that the in-focus state is maintained.

Hill-Climbing AF Operation

Figure 4:
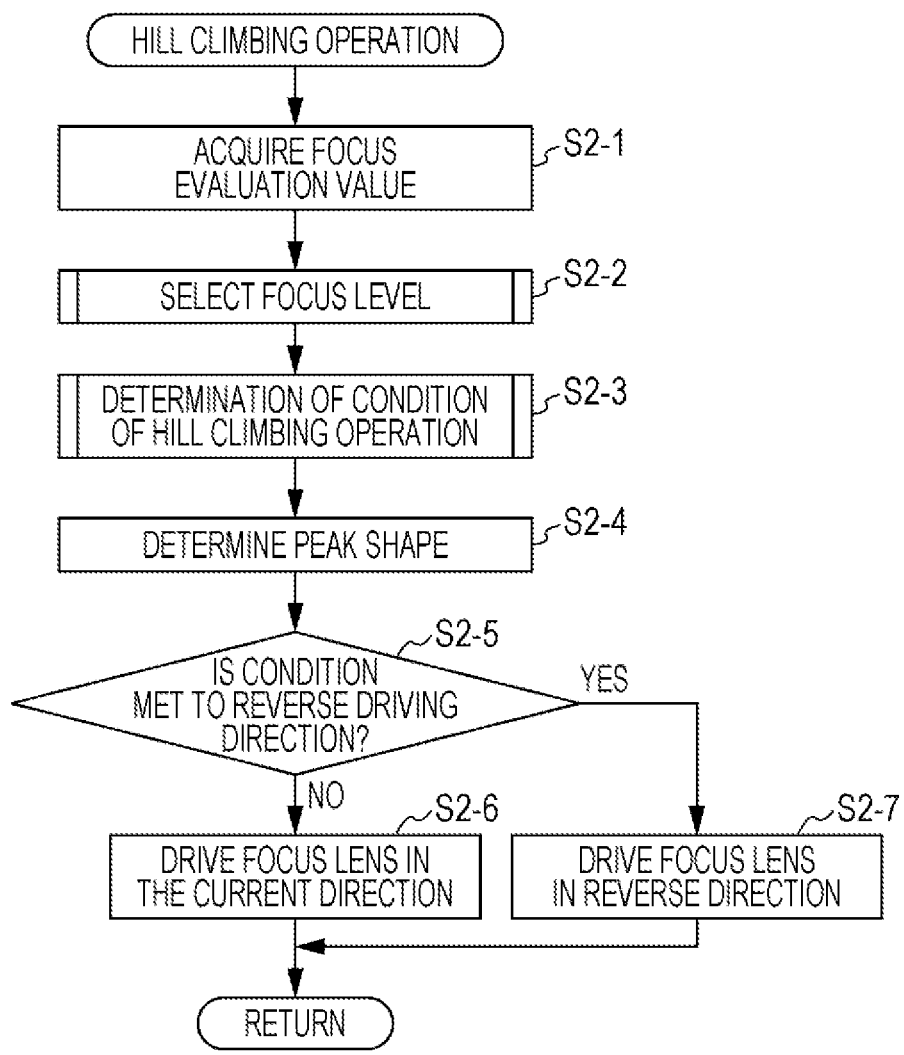
FIG. 4 is a flow chart illustrating a hill-climbing AF operation performed in an image pickup apparatus according to an embodiment.

Next, the hill-climbing AF operation is described in further detail below. The hill-climbing AF operation is an AF operation that is performed at a higher speed than the wobbling that is performed to detect the in-focus position. More specifically, in the hill-climbing AF operation, the focus lens is moved at a predetermined speed to determine the in-focus position based on an increase/decrease in the focus evaluation value acquired. FIG. 4 is a flow chart illustrating a process of hill-climbing AF operation.

In operation S2-1, the system control unit 115 acquires a focus evaluation value from the AF unit 105. In operation S2-2, the system control unit 115 executes a focus level selection process. In the focus level selection process, a focus level is selected which is to be used in a next operation S2-3, i.e., in a process of determining driving conditions in the hill-climbing AF operation. In operation S2-3, the system control unit 115 executes the process of determining driving conditions in the hill-climbing AF operation. The process of determining driving conditions in the hill-climbing AF operation is a process of determining conditions of driving the focus lens in the hill-climbing AF operation. In this process of determining driving conditions in the hill-climbing AF operation, a driving speed and a driving direction (or a target position) in the driving of the focus lens are determined. The focus level selection process and the process of determining driving conditions in the hill-climbing AF operation will be described in further detail later.

In operation S2-4, the system control unit 115 determines a shape of a hill (a shape of a curve of a graph) formed by the focus evaluation values, based on the focus evaluation value acquired in operation S2-1 and focus evaluation values acquired before that. More specifically, if the acquired focus evaluation value increases successively a predetermined number of times of acquisition, and if a decrease occurs thereafter, then it is determined that a position of a peak of the hill (hereinafter referred to as a peak position) has been detected. On the other hand, if the acquired focus evaluation value decreases successively a predetermined number of times as the focus lens moves in the same direction, then it is determined that the focus lens is moving away from the peak of the hill. In a case where it is determined that the focus lens is moving away from the peak of the hill, it is determined that a condition to reverse the direction of driving the focus lens is met. Note that in a case where as many focus evaluation values as necessary to determine the shape of the hill are not acquired, or in a case where it is difficult to clearly determine whether the focus evaluation value is increasing or decreasing, the hill-climbing AF operation is continued while maintaining the current driving condition.

In operation S2-5, based on the result of the determination in operation S2-4, the system control unit 115 determines whether the condition to reverse the direction in which the focus lens is driven is met. If the condition is met (i.e., the answer to operation S2-5 is Yes), the process proceeds to operation S2-7. In operation S2-7, under the control of the system control unit 115, the focus lens control unit 104 sets the direction of driving the focus lens so as to be opposite to the immediately previous direction. The focus lens control unit 104 then drives the focus lens in the newly set direction. On the other hand, in a case where it is determined in operation S2-5 that the condition to reverse the direction is not met (i.e., the answer to operation S2-5 is No), the process proceeds to operation S2-6. In operation S2-6, the focus lens is driven in the same direction as the previous direction.

Note that in operation S2-6 and operation S2-7 described above, the system control unit 115 drives the focus lens according to the hill-climbing AF drive conditions determined in operation S2-3. More specifically, the system control unit 115 moves the focus lens at the driving speed determined in operation S2-3 in the direction (or to the target position) determined in operation S2-3. Note that at the beginning, the focus lens at rest is moved in a direction detected in wobbling. In the second and following driving, the driving direction and the driving speed of the focus lens are determined based on the conditions determined in operation S2-4.

Thus, the system control unit 115 performs the hill-climbing AF operation in the above-described manner.

Wobbling

Figure 5:
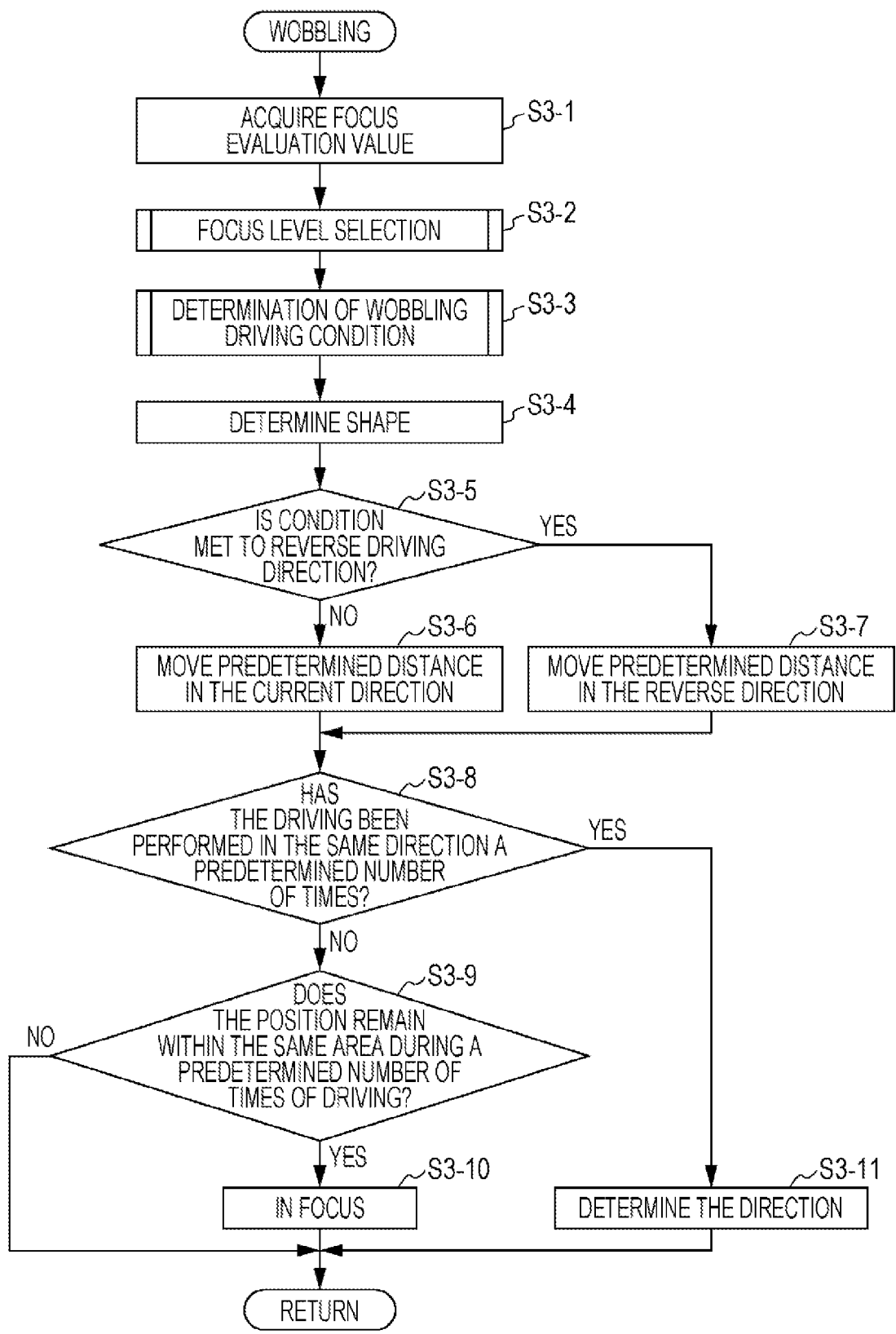
FIG. 5 is a flow chart illustrating wobbling performed in an image pickup apparatus according to an embodiment.

Next, the wobbling is explained. The wobbling is an AF operation to detect an in-focus position or a direction in which the focus lens is to be driven toward the in-focus position. In the wobbling, the focus lens is driven operation by operation such that it moves a predetermined distance in each step, and the in-focus position or the direction to the in-focus position is detected based on an increase or a reduction in the obtained focus evaluation value. FIG. 5 is a flow chart illustrating a wobbling process performed in the image pickup apparatus according to the present embodiment.

In operation S3-1, the system control unit 115 acquires a focus evaluation value from the AF unit 105. In operation S3-2, the system control unit 115 executes the focus level selection process using the focus evaluation value acquired in operation S3-1. In the focus level selection process, a focus level used in the process of determining, in operation S3-3, the wobbling driving conditions. The process of determining, in operation S3-3, the wobbling driving conditions is a process of determining conditions of driving the focus lens in the wobbling process. More specifically, the moving distance of the focus lens in the wobbling is determined. The focus level selection process and the process of determining the wobbling driving conditions will be described in further detail later.

In operation S3-4, the system control unit 115 determines a shape of a hill (a shape of a curve of a graph) formed by the focus evaluation values acquired in operation S3-1 and focus evaluation values acquired before that. More specifically, the system control unit 115 compares the focus evaluation value acquired this time with the focus evaluation value acquired the previous time, and determines whether an increase or a reduction has occurred by an amount equal to or greater than a predetermined value. If a reduction is detected in focus evaluation value with the movement of the focus lens in the current direction, then it is determined that the condition to reverse the direction is met. Note that the position at which the condition to reverse the direction is met is stored a predetermined number of times. The stored positions at which the condition to reverse the direction was met are used in a determination in operation S3-9 as will be described later. On the other hand, when an increase in focus evaluation value occurs successively, the number of times of the occurrence (counter value) is measured. If the increase in focus evaluation value occurs successively a predetermined number of times, it is determined that the focus evaluation value will have its peak if the focus lens is moved further in the current driving direction. Thus, in this case, the driving direction of the focus lens is set to the current driving direction. As described above, in operation S3-4, the system control unit 115 detects the shape of the hill formed by the focus evaluation values in the wobbling (the shape of a curve of a graph).

In operation S3-5, the system control unit 115 determines whether the condition to reverse the driving direction of the focus lens in the wobbling operation is met. In a case where the detection in operation S3-4 indicates that the condition to reverse the direction is met (i.e., if the answer to operation S3-5 is Yes), the process proceeds to operation S3-7. In operation S3-7, the system control unit 115 controls the focus lens control unit 104 to move the focus lens by a predetermined distance in a direction opposite to the previous driving direction. On the other hand, in a case where it is determined in operation S3-5 that the condition to reverse the direction is not met (i.e., if the answer to operation S3-5 is No), the process proceeds to operation S3-6. In operation S3-6, the system control unit 115 controls the focus lens control unit 104 to move the focus lens by a predetermined distance in the same direction as the previous driving direction.

In operation S3-6 and operation S3-7, the focus lens control unit 104 moves the focus lens according to the driving conditions determined in operation S3-3. More specifically, the focus lens control unit 104 moves the focus lens by the distance determined in operation S3-3. Note that in operation S3-6 and operation S3-7, the focus lens is driven at a predetermined fixed speed.

In operation S3-8, the system control unit 115 determines whether the focus lens has been driven in the same direction successively a predetermined number of times. This determination is made based on the number of times (counter value) measured in operation S3-4. In a case where it is determined that the driving has been performed in the same direction successively the predetermined number of times (i.e., the answer to operation S3-8 is Yes), the process proceeds to operation S3-11. In operation S3-11, it is determined that the peak of the focus evaluation value is ahead in the current driving direction of the focus lens. Thus, the direction in which the focus lens is to be driven toward the peak value of the focus evaluation value is determined. On the other hand, in a case where it is not determined in operation S3-8 that the driving has been performed in the same direction successively the predetermined number of times (i.e., if the answer to operation S3-8 is No), the process proceeds to operation S3-9.

In operation S3-9, a determination is made as to whether the focus lens has remained in the same area in the predetermined number of executions of operation S3-5. This determination may be made based on the information on the driving direction reversing positions stored in operation S3-4. In a case where it is not determined in operation S3-9 that the focus lens has remained in the same area in the predetermined number of executions of operation S3-5 (i.e., the answer to operation S3-9 is No), the wobbling process is ended. On the other hand, in a case where it is determined that the focus lens has remained in the same area in the predetermined number of executions of operation S3-5 (i.e., if the answer to operation S3-9 is Yes), the process proceeds to operation S3-10. In operation S3-10, the system control unit 115 determines that the focus lens is in an in-focus position. When the focus evaluation value increases and decreases alternately or nearly alternately in a short range around the peak of the hill of the focus evaluation value, the process described above is performed.

The wobbling performed in the image pickup apparatus 1 according to the present embodiment has been described above.

Focus Level Selection Process

Figure 6:
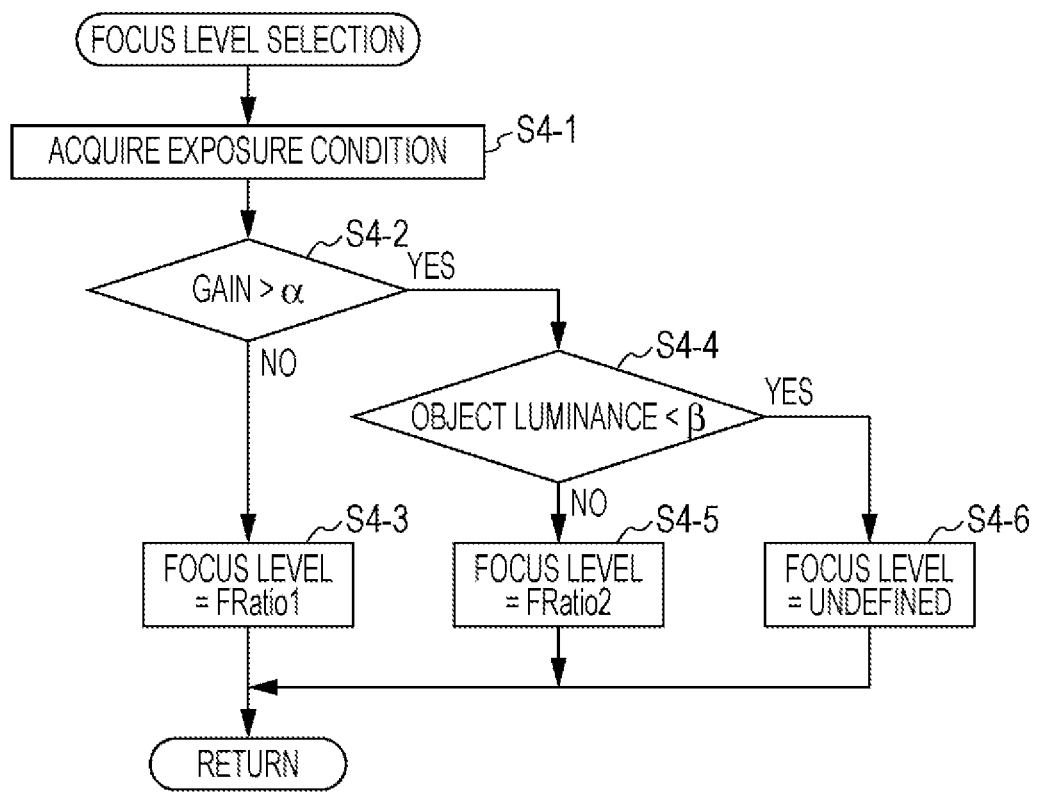
FIG. 6 is a flow chart illustrating a focus level selection process performed in an image pickup apparatus according to an embodiment.

Next, a focus level selection process is described. FIG. 6 is a flow chart illustrating the focus level selection process. The focus level selection process is performed in the hill-climbing AF operation in operation S2-2 (FIG. 4) and in the wobbling in operation S3-2 (FIG. 5). The focus level selection process is performed to select a focus level. The focus level is used in determining the conditions of driving the focus lens in the hill-climbing AF operation and the wobbling.

In operation S4-1, the system control unit 115 acquires current exposure conditions from the AE unit 103 and the image pickup processing unit 109 (detection unit). The exposure conditions acquired herein are in terms of a signal gain determined by the AE unit 103 and an object luminance indicating luminance of an object. Note that the exposure conditions acquired by the system control unit 115 may include at least one of the signal gain determined by the AE unit 103 and the object luminance indicating the luminance of the object. In operation S4-2, the system control unit 115 determines whether the signal gain is greater than a predetermined value α. In general, when an object has high luminance, it is possible to achieve a proper exposure within a controllable shutter speed range, and thus the signal gain is set to 0. On the other hand, when an object is low in luminance, it is difficult to achieve a proper exposure within the controllable shutter speed range, and thus the signal gain is set to be high. Note that in the present embodiment, the predetermined value α is set to 0. Therefore, in a case where it is determined in operation S4-2 that the signal gain is equal to or lower than the predetermined value, i.e., in a case where the exposure may be properly controlled without amplifying the signal (i.e., the answer to operation S4-2 is No), the process proceeds to operation S4-3. In operation S4-3, the system control unit 115 sets the focus level to a first focus level FRatio1. Note that the first focus level (FRatio1) is given by the output of the AF unit (FIG. 2).

In a case where it is determined in operation S4-2 that the signal gain is greater than the predetermined value α (i.e., if the answer to operation S4-2 is Yes), the process proceeds to operation S4-4. In operation S4-4, based on the object luminance acquired in operation S4-1, a determination is made as to whether the object luminance is lower than a predetermined value β. In the present embodiment, the predetermined value β is set to a lower limit of the object luminance that may be tracked by the AE unit 103. In a case where it is determined in operation S4-4 that the object luminance is equal to or higher than the predetermined value β (i.e., if the answer to operation S4-4 is No), the process proceeds to operation S4-5. In operation S4-5, the system control unit 115 sets the focus level to the second focus level (FRatio2). Note that the second focus level (FRatio2) is provided by the output of the AF unit 105 (FIG. 2). In a case where it is determined in operation S4-4 that the object luminance is lower than the predetermined value β (i.e., if the answer to operation S4-4 is Yes) the process proceeds to operation S4-6. In operation S4-6, the focus level is set to a third focus level (FRatio3). Note that the third focus level (FRatio3) is different from the first focus level (FRatio1) and the second focus level (FRatio2), and its value is undefined.

Thus, for a high-luminance scene, the first focus level (FRatio1) is selected as the focus level to easily detect a change in signal. When luminance of a scene is low but it is still sufficiently high to perform the AF operation, the second focus level (FRatio2) is selected as the focus level to avoid the influence of noise. For a scene with a low luminance close to the lower limit of the range in which the AF operation is possible, the third focus level (FRatio3) is selected as the focus level. In a case where the third focus level (FRatio3) is selected, i.e., when the focus level is undefined, this means that the focus level is low in reliability. The focus level is properly selected depending on the scene to be shot, as described above.

In the focus level selection process, as described above, using the first focus level, the second focus level, and the exposure conditions detected by the detection unit, the system control unit 115 selects a focus level used in the driving of the focus lens. That is, using the exposure condition, the first focus level (FRatio1), and the second focus level (FRatio2), the system control unit 115 determines whether the first focus level (FRatio1) is reliable. In a case where the determination made by the system control unit 115 is that the first focus level (FRatio1) is reliable, the first focus level (FRatio1) is selected as the focus level used in the driving of the focus lens. On the other hand, In a case where the determination made by the system control unit 115 is that the first focus level (FRatio1) is not reliable, the second focus level (FRatio2) is selected as the focus level used in the driving of the focus lens. In this case, the system control unit 115 further determines whether the second focus level is reliable. In a case where the determination made by the system control unit 115 is that the second focus level (FRatio2) is not reliable, the third focus level (FRatio3) is selected as the focus level used in the driving of the focus lens. When the third focus level (FRatio3) is selected, the focus level is not reliable.

Process of Determining Driving Conditions in the Hill-Climbing AF Operation

Figure 7:
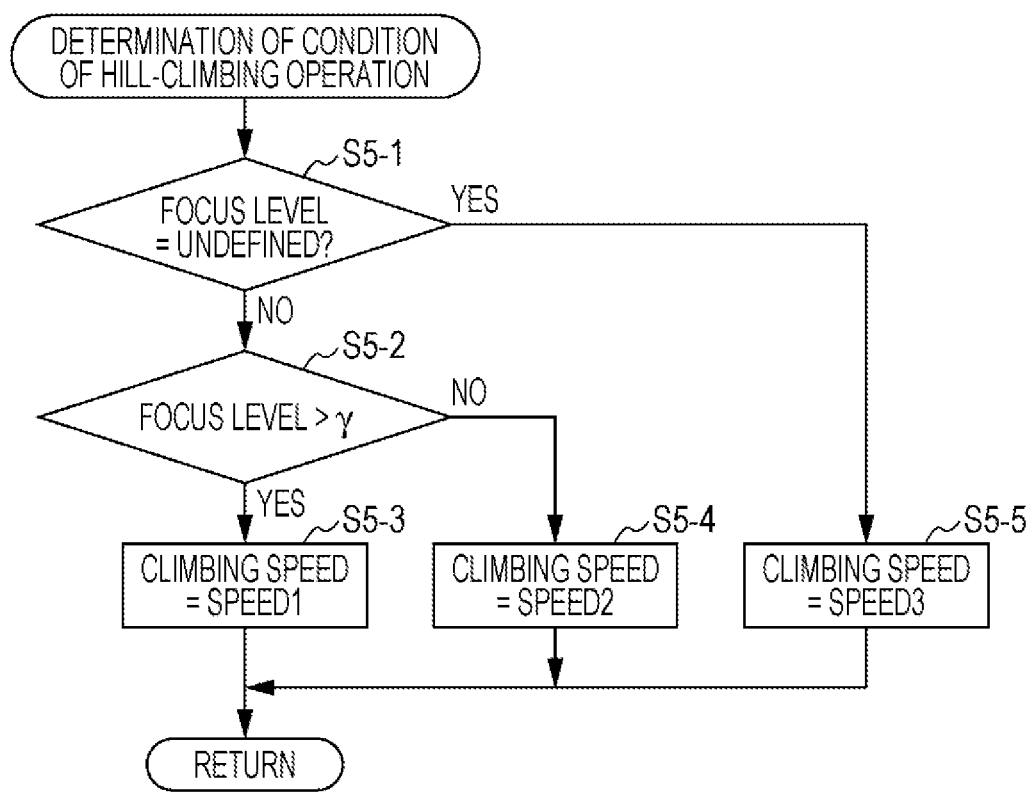
FIG. 7 is a flow chart illustrating a process of determining a driving condition in a hill-climbing AF operation performed in an image pickup apparatus according to an embodiment.

Next, the process of determining the driving condition in the hill-climbing AF operation of the image pickup apparatus 1 according to the present embodiment is described in further detail below. FIG. 7 is a flow chart illustrating the process of determining the driving condition in the hill-climbing AF operation. In this process of determining the driving condition in the hill-climbing AF operation, the condition of driving the focus lens in the hill-climbing AF operation is determined.

As shown in FIG. 7, in operation S5-1 and following steps in the process of determining the driving condition in the hill-climbing AF operation, the processing flow is branched depending on the focus level selected in the focus level selection process. In operation S5-1, the system control unit 115 determines whether the selected focus level is the third focus level (FRatio3), i.e., whether the focus level is undefined. In a case where the selected focus level is the third focus level (FRatio3), i.e., when the focus level is undefined (i.e., if the answer to operation S5-1 is Yes), the process proceeds to operation S5-5. In operation S5-5, the system control unit 115 sets the moving speed (the hill climbing speed) of the focus lens in the hill-climbing AF operation to a predetermined value SPEED3. In a case where it is not determined in operation S5-1 that the focus level is the third focus level (FRatio3), i.e. when it is not determined that the focus level is undefined (i.e., if the answer to operation S5-1 is No), the process proceeds to operation S5-2. In operation S5-2, the system control unit 115 determines whether the selected focus level is greater than a predetermined value γ. Note that in the present embodiment, the focus level approaches 1.0 in a range close to the in-focus position, and the focus level decreases with the focus goes out of the in-focus point, and thus the predetermined value γ is set to 0.5. In a case where it is determined in operation S5-2 that the focus level is greater than the predetermined value γ, the process proceeds to operation S5-3. In operation S5-3, the system control unit 115 sets the moving speed of the focus lens in the hill-climbing AF operation to a predetermined value SPEED1. On the other hand, in a case where it is determined in operation S5-2 that the focus level is equal to or lower that the predetermined value γ (i.e., the answer to operation S5-2 is No), the process proceeds to operation S5-4. In operation S5-4, the system control unit 115 sets the moving speed of the focus lens in the hill-climbing AF operation to a predetermined value SPEED2.

Note that SPEED1, SPEED2, and SPEED3 have values such that SPEED1<SPEED3<SPEED2. That is, SPEED1 is smaller than SPEED2, and SPEED3 is between SPEED1 and SPEED2. In the present embodiment, SPEED1 is determined such that the focus lens is moved by a distance corresponding to one-half the depth of focus if the focus lens is driven at SPEED1 for one period in which the image sensor 108 generates the image signal repeatedly. This setting makes it possible to prevent or suppress an overshoot in the vicinity of the in-focus position. SPEED2 is determined such that if the focus lens is driven at SPEED2, the focus lens moves by a distance corresponding to twice the depth of focus thereby to quickly return from an out-of-focus state. On the other hand, SPEED3 is set such that the focus lens is moved by a distance corresponding to the depth of focus. SPEED3 is set to such a value because SPEED3 is used for a scene for which the speed is not switched based on the focus level. By setting SPEED3 to such a value, it becomes possible to prevent overshooting in the vicinity of the in-focus position and it becomes possible to easily detect a change in signal in an out-of-focus state.

As described above, the system control unit 115 controls the moving speed of the focus lens in the hill-climbing AF operation such that the moving speed becomes lower as the selected focus level increases, while the moving speed becomes higher as the selected focus level decreases. When the third focus level (FRatio3) is selected, the system control unit 115 sets the moving speed of the focus lens in the hill-climbing AF operation to SPEED3. SPEED3 has an arbitrary value between the moving speed of the focus lens SPEED1 that is selected when the first focus level (FRatio1) is selected and the moving speed of the focus lens SPEED2 that is selected when the second focus level (FRatio2) is selected. The focus lens control unit 104 controls the driving of the focus lens according to the set moving speed of the focus lens.

As described above, in a case where it is not determined that the reliability of focus level is low (as is when a scene is high in luminance), the moving speed of the focus lens is selected depending on the focus level. More specifically, SPEED1 or SPEED2 is selected as the moving speed of the focus lens depending on the focus level to properly detect the shape of the focus evaluation value. On the other hand, in a case where a scene is low in luminance and thus the reliability of focus level is low, the moving speed of the focus lens is not selected depending on the focus level but the moving speed is selected differently. This is because it is difficult to distinguish between a case where a low contrast is caused by a blur of an image although the scene has high luminance and a case where a contrast is caused by low luminance although an image does not have a blue. In other words, because it is difficult to determine whether a low contrast is caused by a blur of an image with high luminance or by low luminance of the image with no blur.

Figure 10A:
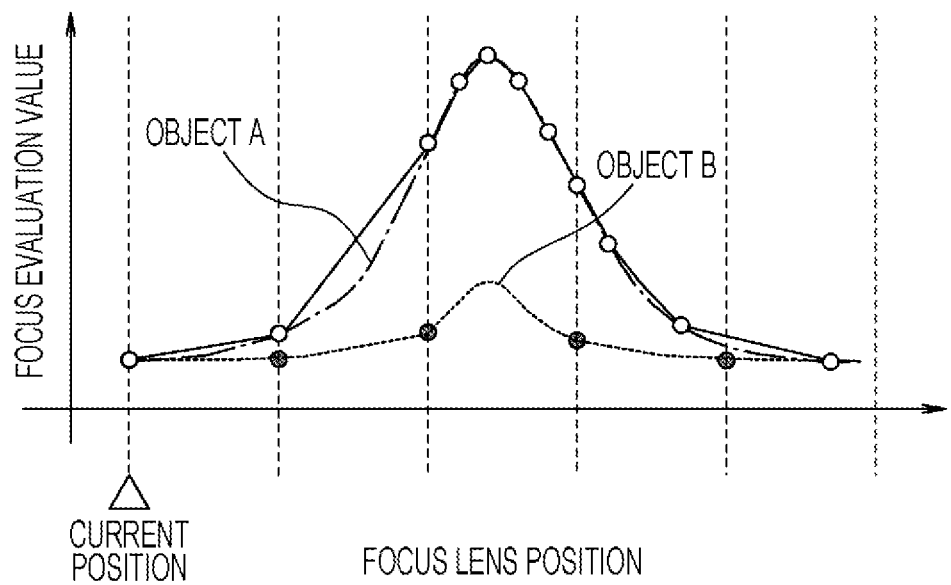
FIGS. 10A and 10B are graphs illustrating a change in focus evaluation value and a change in focus level as a function of a focus lens position, depending on a type of an object, in an image pickup apparatus according to an embodiment.
Figure 10B:
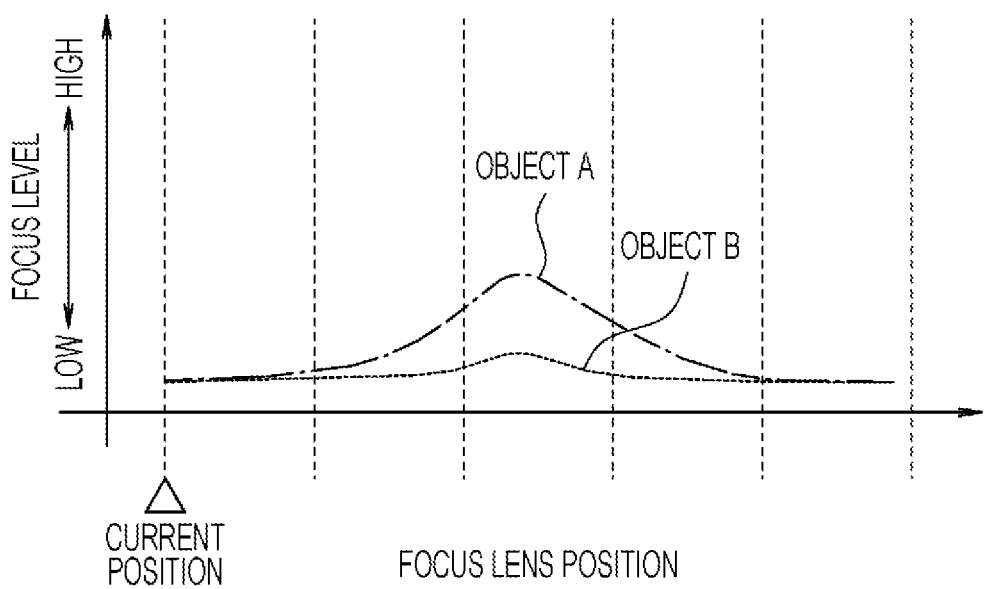

FIG. 10A is a graph illustrating a focus evaluation value as a function of a focus lens position for a case where the moving speed of the focus lens is controlled depending on the focus level for each of different objects, i.e., an object A having high luminance, and an object B having low luminance. FIG. 10B is a graph illustrating a focus level for the object A and that for the object B. When the focus lens is at a starting position (denoted by "CURRENT POSITION" in FIG. 10B) from which the focus level determination process starts, both the object A and the object B are in a low focus level state. In the case of the object A, when the moving speed of the focus lens is controlled depending on the focus level, it is possible to obtain as many focus evaluation values as necessary to recognize the shape of the focus evaluation value curve. On the other hand, in the case of the object B, when the moving speed of the focus lens is controlled depending on the focus level, the focus level remains in a low state, and thus the moving speed of the focus lens is maintained at the same speed (high speed) as that employed when the focus level determination process is started. In this case, there is a possibility that it is impossible to acquire as many focus evaluation values as necessary to determine the shape of the focus evaluation value curve, in particular, in a range close to the peak position. In view of the above, in the present embodiment, the image pickup apparatus 1 has two modes of controlling the moving speed of the focus lens. In one mode, the moving speed of the focus lens is controlled depending on the focus level, while the moving speed of the focus lens is not dependent on the focus level in the other mode. One of the two modes is properly selected depending on the situation.

The process of selecting the focus level in the image pickup apparatus 1 according to the present embodiment has been described above.

Process of Deterring Driving Conditions in Wobbling Operation

Figure 8:
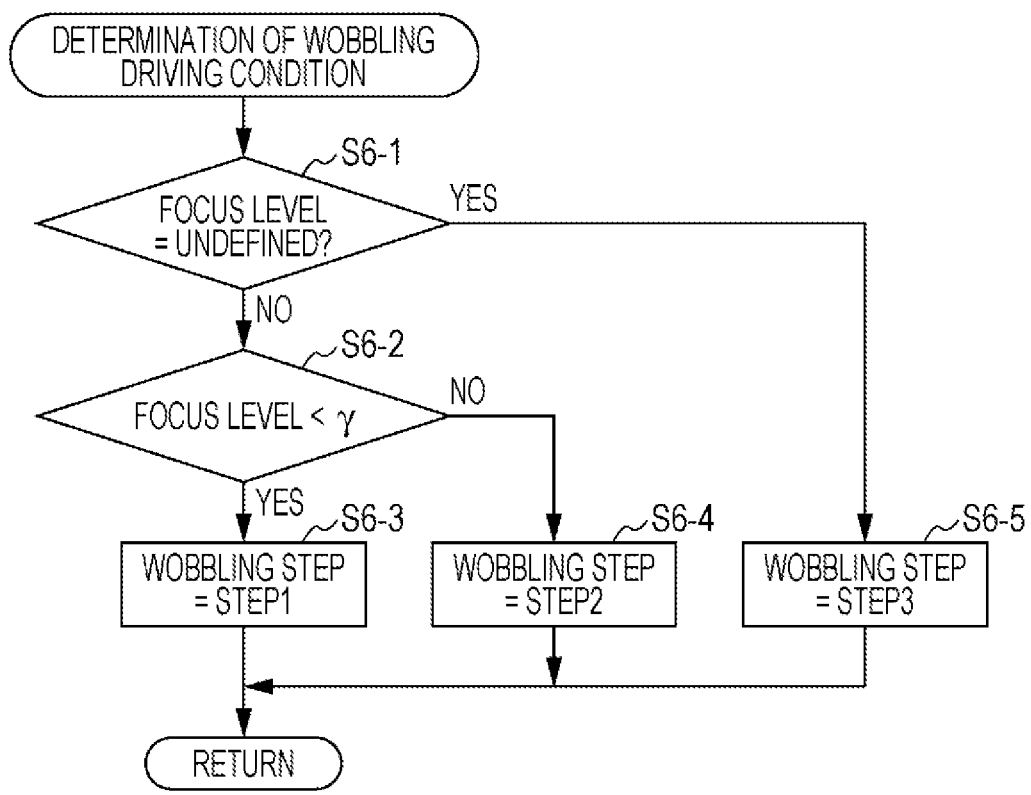
FIG. 8 is a flow chart illustrating a process of determining a driving condition in a wobbling operation performed in an image pickup apparatus according to an embodiment.

Next, a description is given below as to the process of determining the driving conditions in the wobbling operation in the image pickup apparatus 1 according to the present embodiment. FIG. 8 is a flow chart illustrating the process of determining the driving conditions in the wobbling operation performed in the image pickup apparatus 1 according to an embodiment. The process of determining the driving conditions in the wobbling operation is performed to determine the conditions in terms of driving the focus lens in the wobbling operation. The process of determining the driving conditions in the wobbling operation is performed in operation S3-3 in the wobbling process (FIG. 5)

The process of determining the driving conditions in the wobbling operation including operation S6-1 and following steps is branched depending on the focus level selected in the focus level selection process. In operation S6-1, the system control unit 115 determines whether the selected focus level is the third focus level (FRatio3), i.e., whether the focus level is undefined. In a case where the selected focus level is the third focus level (FRatio3) i.e., when the focus level is undefined (i.e., if the answer to operation S6-1 is Yes), the process proceeds to operation S6-5. In operation S6-5, the system control unit 115 sets the moving distance of the focus lens in the wobbling process to a predetermined value STEP3. On the other hand, in a case where it is not determined that the focus level is the third focus level (FRatio3) i.e. when it is not determined that the focus level is undefined (i.e., the answer to operation S6-1 is No), the process proceeds to operation S6-2. In operation S6-2, the system control unit 115 determines whether the selected focus level is greater than a predetermined value γ. In a case where it is determined in operation S6-2 that the selected focus level is greater than the predetermined value γ (i.e., if the answer to operation S6-2 is Yes), the process proceeds to operation S6-3. In operation S6-3, the system control unit 115 sets the moving distance of the focus lens to a predetermined value STEP1 different from operation 3. In a case where it is determined in operation S6-2 that the selected focus level is not greater than the predetermined value γ, (i.e., if it is determined that the selected focus level is equal to or lower that the predetermined value γ) (i.e., the answer to operation S6-2 is No), the process proceeds to operation S6-4. In operation S6-4, the system control unit 115 sets the moving distance of the movement of the focus lens to a predetermined value STEP2, which is different from STEP1 and STEP3.

The values STEP1, STEP2, and STEP3 of moving distance of the focus lens in the wobbling operation are selected such that STEP1<STEP3<STEP2. That is, STEP1 is smaller than STEP2, and STEP3 is between STEP1 and STEP2. In the present embodiment, to achieve high-precision control in the vicinity of the in-focus position, STEP1 is set to a value of the moving distance of the focus lens corresponding to one-half the depth of focus. On the other hand, to make it possible to quickly return from an out-of-focus state, STEP2 is set to a value of the moving distance of the focus lens corresponding to twice the depth of focus. STEP3 is set to a value of the moving distance of the focus lens corresponding to the depth of focus. STEP3 is set to such a value because SPEED3 is used for a scene for which the moving distance is not switched based on the focus level. By setting STEP3 to such a value, it becomes possible to achieve high-precision control in the vicinity of the in-focus position and it also becomes possible to easily detect a change in signal in an out-of-focus state.

That is, the moving distance of the focus lens in the wobbling operation is set such that the moving distance becomes greater as the selected focus level increases, while the moving distance becomes lower as the selected focus level decreases. When the third focus level (FRatio3) is selected, the system control unit 115 sets the moving distance of the focus lens in the wobbling operation to STEP3. STEP3 has an arbitrary value between STEP1 which is the moving distance of the focus lens selected when the first focus level (FRatio1) is selected and STEP2 which is the moving distance of the focus lens selected when the second focus level (FRatio2) is selected. The focus lens control unit 104 controls the driving of the focus lens according to the determined moving distance of the focus lens.

As described above, in a case where it is determined that the reliability of focus level is not low (as is when a scene is high in luminance), the moving distance of the focus lens is selected depending on the focus level. That is, either STEP1 or STEP2 is selected as the moving distance of the focus lens depending on the focus level to properly detect the shape of the focus evaluation value. On the other hand, in a case where a scene is low in luminance and thus the reliability of focus level is low, the moving distance of the focus lens is not selected depending on the focus level, but STEP3, which is different from STEP1 and STEP2, is selected as the moving distance for the same reason for that in the process of determining the driving conditions in the hill-climbing AF operation.

The process of determining the driving conditions in the wobbling operation in the image pickup apparatus 1 is performed in the above-described manner according to the present embodiment.

As described above, when the third focus level (FRatio3) is selected, the system control unit 115 sets the moving speed of the focus lens in the hill-climbing AF operation to SPEED3. SPEED3 is between the moving speed of the focus lens SPEED1 that is selected when the first focus level (FRatio1) is selected and the moving speed of the focus lens SPEED2 that is selected when the second focus level (FRatio2) is selected. The focus lens control unit 104 controls the driving of the focus lens according to the set moving speed of the focus lens. Furthermore, when the third focus level (FRatio3) is selected, the system control unit 115 sets the moving distance of the focus lens in the wobbling operation to STEP3. STEP3 has an arbitrary value between STEP1 which is the moving distance of the focus lens selected when the first focus level (FRatio1) is selected and STEP2 which is the moving distance of the focus lens selected when the second focus level (FRatio2) is selected. The focus lens control unit 104 controls the driving of the focus lens according to the set moving distance of the focus lens.

As described above, when the third focus level (FRatio3) is selected, the system control unit 115 sets the driving conditions of the focus lens to arbitrary values between those employed in case where the first focus level is selected and those employed in the case where second focus level is selected, and the focus lens control unit 104 controls the driving of the focus lens according to the determined driving conditions.

While the disclosure has been described in detail with reference to embodiments, it is to be understood that the disclosure is not limited to the disclosed embodiments, and various modifications are possible without departing from the spirit and scope of the present disclosure. Note that any such modification falls within the scope of the present disclosure.

For example, in the embodiments described above, the moving speed of the focus lens in the hill-climbing AF operation or the moving distance of the focus lens in the wobbling operation are set to one of predetermined values depending on the focus level. Alternatively, the moving speed or the moving distance of the focus lens may be set to a value that is not predetermined but calculated depending on the situation. More specifically, in a case where the selected focus level is between predetermined values, the moving speed or the moving distance of the focus lens may be set to an intermediate value calculated by a linear interpolation from the predetermined values.

Figure 11:
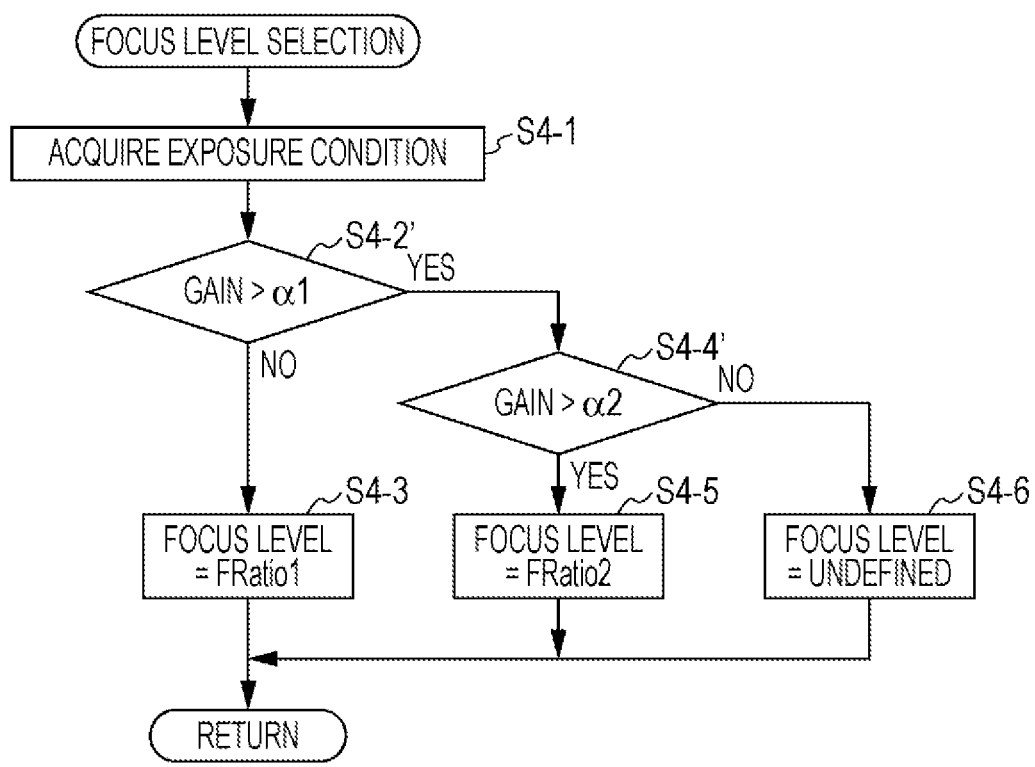
FIG. 11 is a flow chart illustrating a process of selecting a focus level depending on a gain in amplifying a signal in an image pickup apparatus according to an embodiment.
Figure 12:
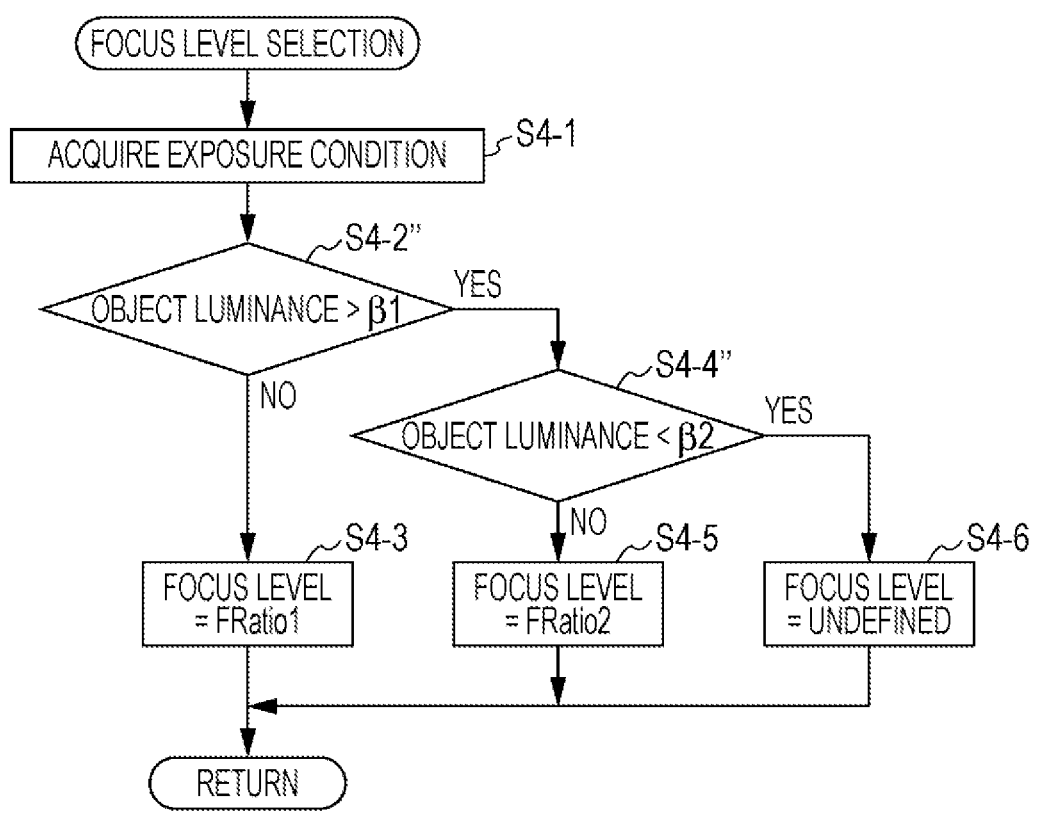
FIG. 12 is a flow chart illustrating a process of selecting a focus level depending on an object luminance in an image pickup apparatus according to an embodiment.

Furthermore, the process shown in FIG. 6 may be modified as shown in FIG. 11 or FIG. 12. FIG. 11 is a flow chart illustrating a process of selecting the focus level depending only on the gain in amplifying the signal in the image pickup apparatus according to an alternative embodiment. FIG. 12 is a flow chart illustrating a process of selecting the focus level depending only on the object luminance in the image pickup apparatus according to an alternative embodiment. In the example shown in FIG. 11, the focus level is switched depending on the signal gain relative to predetermined values $\alpha 1$ and $\alpha 2$, where $\alpha 1$ may be set to 0 and $\alpha 2$ may be set to a maximum allowable value that may be handed by the AE unit 103. In the example shown in FIG. 12, the focus level is switched depending on the object luminance relative to predetermined values $\beta 1$ and $\beta 2$, where $\beta 1$ may be set to a value above which the AE unit 103 amplifies the signal and $\beta 2$ may be set to a value at which a maximum allowable gain is employed. Note that in these examples, only operation S4-2 and operation S4-4 in FIG. 6 are modified but other steps are the same.

Other Embodiments

Aspects of the embodiments may also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

Disclosed aspects of the embodiments may be realized by an apparatus, a machine, a method, a process, or an article of manufacture that includes a non-transitory storage medium having a program or instructions that, when executed by a machine or a processor, cause the machine or processor to perform operations as described above. The method may be a computerized method to perform the operations with the use of a computer, a machine, a processor, or a programmable device. The operations in the method involve physical objects or entities representing a machine or a particular apparatus (e.g., a document editing apparatus, a document). In addition, the operations in the method transform the elements or parts from one state to another state. The transformation is particularized and focused on document editing. The transformation provides a different function or use such as extracting a layout variable, adjusting a value of the layout variable, displaying the document, etc.

In addition, elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any optical, electromechanical, electromagnetic, or electronic devices. The term software generally refers to a logical structure, a method, a procedure, a program, a routine, a process, an algorithm, a formula, a function, an expression, etc. A software implementation typically includes realizing the above elements (e.g., logical structure, method, procedure, program) as instruction codes and/or data elements embedded in one or more storage devices and executable and/or accessible by a processor, a CPU/MPU, or a programmable device as discussed above. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations.

All or part of an embodiment may be implemented by various means depending on applications according to particular features, functions. These means may include hardware, software, or firmware, or any combination thereof. A hardware, software, or firmware element may have several modules or units coupled to one another. A hardware module/unit is coupled to another module/unit by mechanical, electrical, optical, electromagnetic or any physical connections. A software module/unit is coupled to another module by a function, procedure, method, subprogram, or subroutine call, a jump, a link, a parameter, variable, and argument passing, a function return, etc. A software module/unit is coupled to another module/unit to receive variables, parameters, arguments, pointers, etc. and/or to generate or pass results, updated variables, pointers, etc. A firmware module/unit is coupled to another module/unit by any combination of hardware and software coupling methods above. A hardware, software, or firmware module/unit may be coupled to any one of another hardware, software, or firmware module/unit. A module/unit may also be a software driver or interface to interact with the operating system running on the platform. A module/unit may also be a hardware driver to configure, set up, initialize, send and receive data to and from a hardware device. An apparatus may include any combination of hardware, software, and firmware modules/units.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2011-021012, filed Feb. 2, 2011, which is hereby incorporated by reference herein in its entirety.

What is claimed is:

1. An image pickup apparatus comprising:
an image sensing unit that generates an image signal by performing a photoelectric conversion on an object image;
a focus evaluation value calculation unit that calculates a focus evaluation value indicating a contrast of the image signal;
a control unit that controls a position of a focus lens based on the focus evaluation value;
a focus level calculation unit that calculates a focus level indicating a degree of focus using the focus evaluation value; and
a detection unit that detects an exposure condition in taking an image of an object;
wherein the exposure condition includes a signal gain of the image signal, and
wherein the control unit determines a driving condition of the focus lens such that in a case where the signal gain is equal to a first value, the driving condition is determined based on a focus level calculated using a peak value of high-frequency component of the image signal, while in a case where the signal gain corresponds to a second value greater than the first value, the driving condition is determined based on a focus level calculated using a value determined by integrating a peak value of a high-frequency component of the image signal in each line over a plurality of lines.

2. The image pickup apparatus according to claim 1, wherein in a first case where the focus level depending on the signal gain is greater than the focus level in a second case, the control unit sets the driving speed of the focus lens to a value smaller than in the second case.

3. The image pickup apparatus according to claim 2, wherein in a case where the signal gain corresponds to a third value greater than the second value, the control unit sets the driving speed of the focus lens to a value between the value in the first case and the value in the second case.

4. The image pickup apparatus according to claim 1, wherein in a first case where the focus level depending on the signal gain is greater than the focus level in a second case, the control unit sets a driving amount of the focus lens to a value smaller than in the second case.

5. The image pickup apparatus according to claim 4, wherein in a case where the signal gain corresponds to a third value greater than the second value, the control unit sets the driving amount of the focus lens to a value between a value in the first case and a value in the second case.

6. A method of controlling an image pickup apparatus, comprising:
generating an image signal by performing a photoelectric conversion on an object image;

calculating a focus evaluation value indicating a contrast of the image signal;

controlling a position of a focus lens based on the focus evaluation value;

calculating a focus level indicating a degree of focus using the focus evaluation value; and detecting an exposure condition in taking an image of an object;

wherein the exposure condition includes a signal gain of the image signal, and wherein in the controlling, in a case where the signal gain is equal to a first value, the driving condition is determined based on a focus level calculated using a peak value of high-frequency component of the image signal, while in a case where the signal gain corresponds to a second value greater than the first value, the driving condition is determined based on a focus level calculated using a value determined by integrating a peak value of a high-frequency component of the image signal in each line over a plurality of lines.

7. The control method according to claim 6, wherein in the controlling, in a first case where the focus level depending on the signal gain is greater than the focus level in a second case, the driving speed of the focus lens is set to a value smaller than in the second case.

8. The control method according to claim 6, wherein in the controlling, in a case where the signal gain corresponds to a third value greater than the second value, the driving speed of the focus lens is set to a value between the value in the first case and the value in the second case.

9. The control method according to claim 6, wherein in the controlling, in a first case where the focus level depending on the signal gain is greater than the focus level in the second case, a driving amount of the focus lens is set to a value smaller than in the second case.

10. The control method according to claim 9, wherein in the controlling, in a case where the signal gain corresponds to a third value greater than the second value, the driving amount of the focus lens is set to a value between a value in the first case and a value in the second case.

11. A storage medium storing a program that, when executed by a computer, performs operations for controlling an image pickup apparatus, the operations comprising:

generating an image signal by performing a photoelectric conversion on an object image;

calculating a focus evaluation value indicating a contrast of the image signal;

controlling a position of a focus lens based on the focus evaluation value;

calculating a focus level indicating a degree of focus using the focus evaluation value; and detecting an exposure condition in taking an image of an object;

wherein the exposure condition includes a signal gain of the image signal, and wherein in the controlling, in a case where the signal gain is equal to a first value, the driving condition is determined based on a focus level calculated using a peak value of high-frequency component of the image signal, while in a case where the signal gain corresponds to a second value greater than the first value, the driving condition is determined based on a focus level calculated using a value determined by integrating a peak value of a high-frequency component of the image signal in each line over a plurality of lines.

* * * * *